United States Patent
Cheng et al.

(10) Patent No.: US 9,388,371 B2
(45) Date of Patent: Jul. 12, 2016

(54) ELECTROLYTIC COPPER FOIL, CLEANING FLUID COMPOSITION AND METHOD FOR CLEANING COPPER FOIL

(71) Applicant: Chang Chun Petrochemical Co., Ltd., Taipei (TW)

(72) Inventors: Kuei-Sen Cheng, Taipei (TW); Yao-Sheng Lai, Taipei (TW); Tsang-Jin Juo, Taipei (TW); Jui-Chang Chou, Taipei (TW); Hsi-Hsing Lo, Taipei (TW); Yueh-Min Liu, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 27 days.

(21) Appl. No.: 14/046,077

(22) Filed: Oct. 4, 2013

(65) Prior Publication Data

US 2015/0037606 A1 Feb. 5, 2015

(30) Foreign Application Priority Data

Aug. 1, 2013 (TW) .............................. 102127581 A

(51) Int. Cl.
| | |
|---|---|
| *B21C 37/02* | (2006.01) |
| *C11D 11/00* | (2006.01) |
| *B32B 15/01* | (2006.01) |
| *C11D 7/10* | (2006.01) |
| *C25D 1/04* | (2006.01) |
| *B08B 3/08* | (2006.01) |
| *C25D 7/06* | (2006.01) |
| *C25D 11/38* | (2006.01) |

(52) U.S. Cl.
CPC .............. *C11D 11/0029* (2013.01); *B08B 3/08* (2013.01); *B32B 15/01* (2013.01); *C11D 7/10* (2013.01); *C25D 1/04* (2013.01); *C25D 7/0614* (2013.01); *C25D 11/38* (2013.01); *Y10T 428/12729* (2015.01)

(58) Field of Classification Search
None
See application file for complete search history.

(56) References Cited

U.S. PATENT DOCUMENTS

| | | | | |
|---|---|---|---|---|
| 4,379,834 | A | * | 4/1983 | Herwig et al. ................. 430/329 |
| 4,507,182 | A | * | 3/1985 | Palvadeau et al. .............. 205/50 |
| 4,961,828 | A | | 10/1990 | Lin et al. |
| 5,356,527 | A | | 10/1994 | Chao et al. |
| 6,291,081 | B1 | * | 9/2001 | Kurabe .................... C25D 1/04 174/257 |
| 6,444,112 | B1 | * | 9/2002 | Imada et al. .................. 205/586 |
| 6,939,620 | B2 | | 9/2005 | Nagai et al. |
| 7,731,831 | B2 | * | 6/2010 | Brenneman et al. ............ 205/76 |
| 7,749,611 | B2 | | 7/2010 | Brenneman et al. |
| 2003/0096082 | A1 | | 5/2003 | Nagai et al. |
| 2007/0141380 | A1 | | 6/2007 | Brenneman et al. |
| 2013/0306486 | A1 | | 11/2013 | Maeda et al. |

FOREIGN PATENT DOCUMENTS

| | | |
|---|---|---|
| JP | 2002-180157 A | 6/2002 |
| JP | 2003-034829 A | 2/2003 |

(Continued)

OTHER PUBLICATIONS

Japanese Office Action Dated May 26, 2015.

*Primary Examiner* — Daniel J Schleis
(74) *Attorney, Agent, or Firm* — Polsinelli PC

(57) ABSTRACT

An electrolytic copper foil includes a copper foil body; and a IIA-group metal adhered to a surface of the copper foil body, wherein a signal strength of the IIA group metal is greater than 0.1% based on a signal strength of copper element as 100% analyzed by a secondary ion mass spectrometer. The present invention also provides a method for cleaning copper foil and a cleaning fluid composition which is used in the cleaning method.

12 Claims, 2 Drawing Sheets

(56) References Cited

FOREIGN PATENT DOCUMENTS

| | | |
|---|---|---|
| JP | 2003-041334 A | 2/2003 |
| JP | 2004-349639 A | 12/2004 |
| JP | 2006-508837 A | 3/2006 |
| JP | 2009-300873 A | 12/2009 |
| JP | 2009-300873 A | 12/2009 |
| TW | 201038766 A1 | 11/2010 |
| WO | WO2012/002418 | 1/2012 |

* cited by examiner

ELECTROLYTIC COPPER FOIL, CLEANING FLUID COMPOSITION AND METHOD FOR CLEANING COPPER FOIL

REFERENCE TO RELATED APPLICATION

This application claims foreign priority under 35 U.S.C. §119(a) to Patent Application No. 102127581, filed on Aug. 1, 2013, in the Intellectual Property Office of Ministry of Economic Affairs, Republic of China (Taiwan, R.O.C.), the entire content of which Patent Application is incorporated herein by reference.

FIELD OF THE INVENTION

The present invention relates to a method to treat the surfaces of electrolytic copper foils, and more particularly, to a method for cleaning a copper foil to adjust the metal composition of the surfaces of the electrolytic copper foil after the anti-rust treatment.

BACKGROUND OF RELATED ART

Electrolytic copper foil is an indispensable material for printed circuit board, and especially the double-sided glossy copper foil can be coated with electrode material for the use of cathode plate of lithium ion secondary battery. Following the increasing demands of consumer electronic products, the demands of lithium ion secondary batteries have increased gradually.

In addition, the development trend of commercial small electronic products is moving toward smaller and lightweight designs. The batteries as driving power not only have to possess the advantages of having high operation voltage, high energy density and long cycle life, but they also have to follow the trend of minimization. Since the non-aqueous electrolyte secondary battery, such as lithium ion secondary battery, possesses the features of high energy density, high capacity and long cycle life, thereby it is used widely as driving power for portable electronic instruments.

In general, the causes of poor preservation of electrolytic copper foil are oxidation and acid corrosion. Therefore, after manufacturing the electrolytic copper foil, it was processed with anti-rust treatment using electroplating, such as chromium coating, or using organic compounds, such as benzotriazole, to form chelate compound with copper, thereby enhancing the resistance of electrolytic copper foil. However, during long term preservation, oxidation and acid corrosion can still occur to the electrolytic copper foil which was processed with electro-plating anti-rust treatment. The defects of poor preservation include the appearance of oxidation spots and discoloring. In the manufacturing process of the copper foils which were used in printed circuit board or the cathode plate of lithium ion secondary battery, the electrolyte is consisting of copper dissolved in sulfuric acid. One possible rationale of causing the defects could be the continuous corrosion of copper foil due to the residual sulfuric acid on the surfaces of copper foil after the formation of foil.

In order to resolve the problem of poor preservation of the electrolytic copper foil due to rusting, in the industry the electrolytic copper foil is washed with water after the anti-rusting treatment using deionized water in two-staged steps to wash the electrolytic copper foil which is coated with anti-rust layer to remove the residual sulfuric ion or other impurities on the surface of the electrolytic copper foil. Also, in the washing steps, there are specific requirements for water pressure, water distribution, washing distance and washing angel.

In addition, in a relevant publication, it indicated the high demands of water quality in the washing steps, and in general the deionized water with conductivity less than 10 μS/cm was used (Printed Circuit Communications, volume 10, 2004). In other words, the soft water with good softening processes was used as cleaning solutions. However, this method is effective for a short period of time to prevent the discoloring of the electrolytic copper foil, but it does not achieve significant effects for the long term preservation of the copper foil.

Therefore, it is an urgent need for the industry to develop an effective method for a surface treatment to improve the anti-oxidation and anti-rust corrosion property of the electrolytic copper foil. The method, which should be especially suitable for the washing steps after the anti-rust treatment, should include a cleaning method, a composition of the cleaning fluid to be used for the cleaning method and an electrolytic copper foil resistant to oxidation and rust-corrosion.

SUMMARY OF THE INVENTION

The present invention provides a cleaning fluid composition for cleaning an electrolytic copper foil, comprising a liquid medium and a salt of a group IIA metal, wherein the metal ion content produced in the liquid medium from the salt of group IIA metal is greater than 10 mg/L.

In one embodiment, the content of the metal ion produced in the liquid medium is greater than 32 mg/L. In another embodiment, the content of the metal ion produced in the liquid medium is greater than 63 mg/L. In other words, the content of the metal ion produced in the liquid medium may be at least from 32 mg/L to 63 mg/L.

The liquid medium can be de-ionized water or pure water.

The IIA group metal ion is a magnesium or calcium ion. In one preferred embodiment of the present invention, the salt of the IIA group metal is at least one of magnesium chloride and calcium chloride.

The present invention also provides a method for cleaning an electrolytic copper foil by using the aforementioned cleaning fluid composition. The method of the present invention can be used to clean various electrolytic foils which are treated or untreated. In one embodiment, the electrolytic copper foil has been processed with anti-rust treatment.

In one embodiment, a rinsing style is used to clean the electrolytic copper foil. In one preferred embodiment, the aforementioned cleaning fluid composition is used through a fan-shaped spray-column style to clean the electrolytic copper foil.

In another embodiment, the electrolytic copper foil is immersed in the aforementioned cleaning fluid composition for 0.1 to 20 seconds.

The present invention also provides an electrolytic copper foil comprising the group-IIA metal which is adhered to a surface of the electrolytic copper foil, wherein the signal strength of the group-IIA metal is greater than 0.1% based on the signal strength of copper element (as 100%) analyzed by a secondary ion mass spectrometry. In one embodiment, the signal strength of the group-IIA metal is in a range from between 0.1 and 0.8%.

The cleaning fluid composition of the present invention contains a group-IIA metal salt which can effectively react with the residual acid groups on the copper foil, such as a sulfate group, a phosphate group, or an acetate group. Therefore, besides the existence of the copper element on the surfaces of the electrolytic copper foil which are washed using the cleaning method of the present invention, the group-IIA metal is also adhered to the surfaces of the electrolytic copper foil, so as to protect the copper foil from acid corrosion during the manufacturing processes and transportation and to further provide excellent protection from oxidation and rust corrosion.

BRIEF DESCRIPTION OF THE DRAWINGS

The present disclosure can be more fully understood by reading the following detailed description of the preferred embodiments, with reference made to the accompanying drawings, wherein.

DETAILED DESCRIPTION OF THE PREFERRED EMBODIMENTS

In the following, specific embodiments are provided to illustrate the detailed description of the present invention. Those skilled in the art can easily conceive the advantages and effects of the present invention, based on the disclosure of the specification. The present invention can also be practiced or applied by referring to the other different embodiments. Each of the details in the specification can also be modified or altered in various ways in view of different aspects and applications, without departing from the spirit of the disclosure of the present invention.

Figure 1:
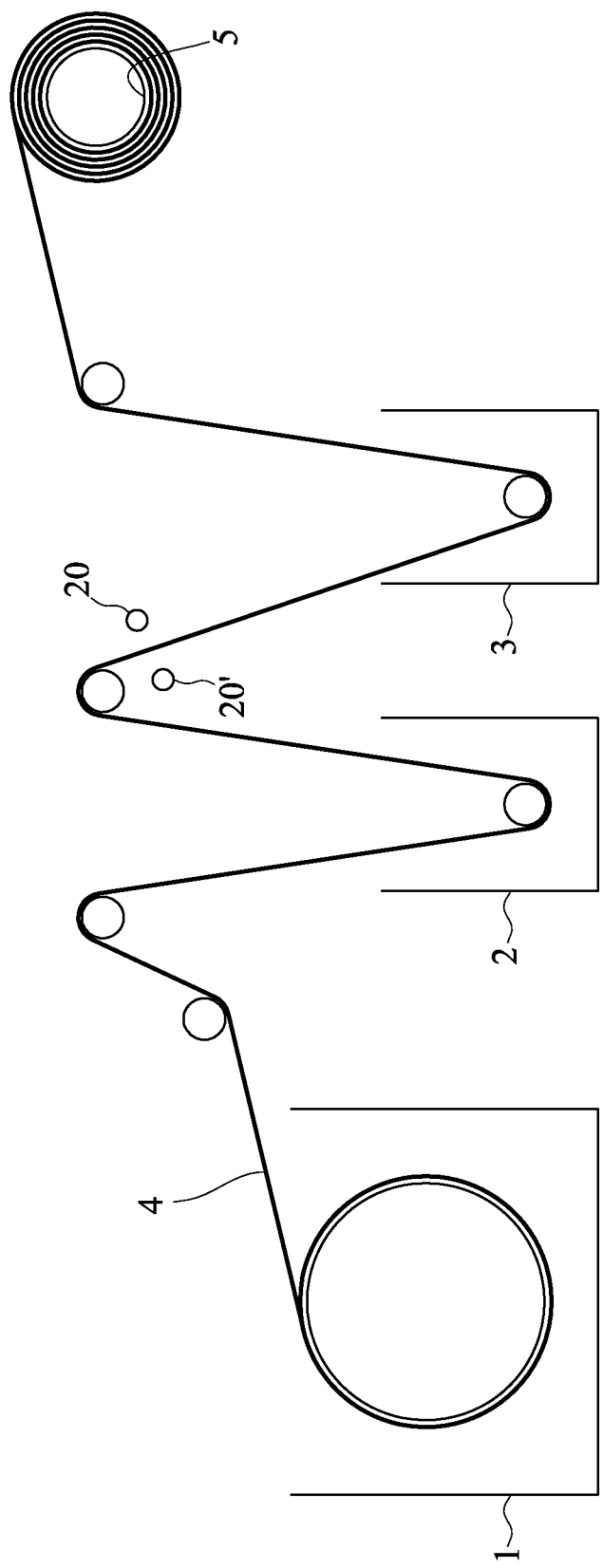
FIG. 1 is a schematic drawing to show the method for cleaning an electrolytic copper foil according to the present invention.

FIG. 1 is a schematic drawing to show a method for cleaning an electrolytic copper foil. In one embodiment, after an electrolytic copper foil 4 was prepared in an electrolytic tank 1, the electrolytic copper foil 4 was moved to a chromic acid tank 2 to add a chrome coating as an anti-rust step. As a washing step, after the chrome-coating step, the electrolytic copper foil was moved to a washing tank 3 filled with the cleaning fluid of the present invention by immersing the chrome-coated electrolytic copper foil for 0.1 to 20 seconds. The electrolytic copper foil 4 was air-dried, and then the electrolytic copper foil 4 was obtained by using a winding device.

In this embodiment, prior to introducing the electrolytic copper foil 4 to the cleaning tank 3, the electrolytic copper foil was also washed using rinsing style with the cleaning fluid composition of the present invention through columns 20 and 20' producing fan-shaped spray-column. When the cleaning fluid composition of the present invention was used to clean the electrolytic copper foil, there were no specific limitations for washing distance, water pressure, water distribution and washing angle. In a preferred embodiment, the electrolytic copper foil 4 was washed with fan-shaped spray-column.

Figure 2:
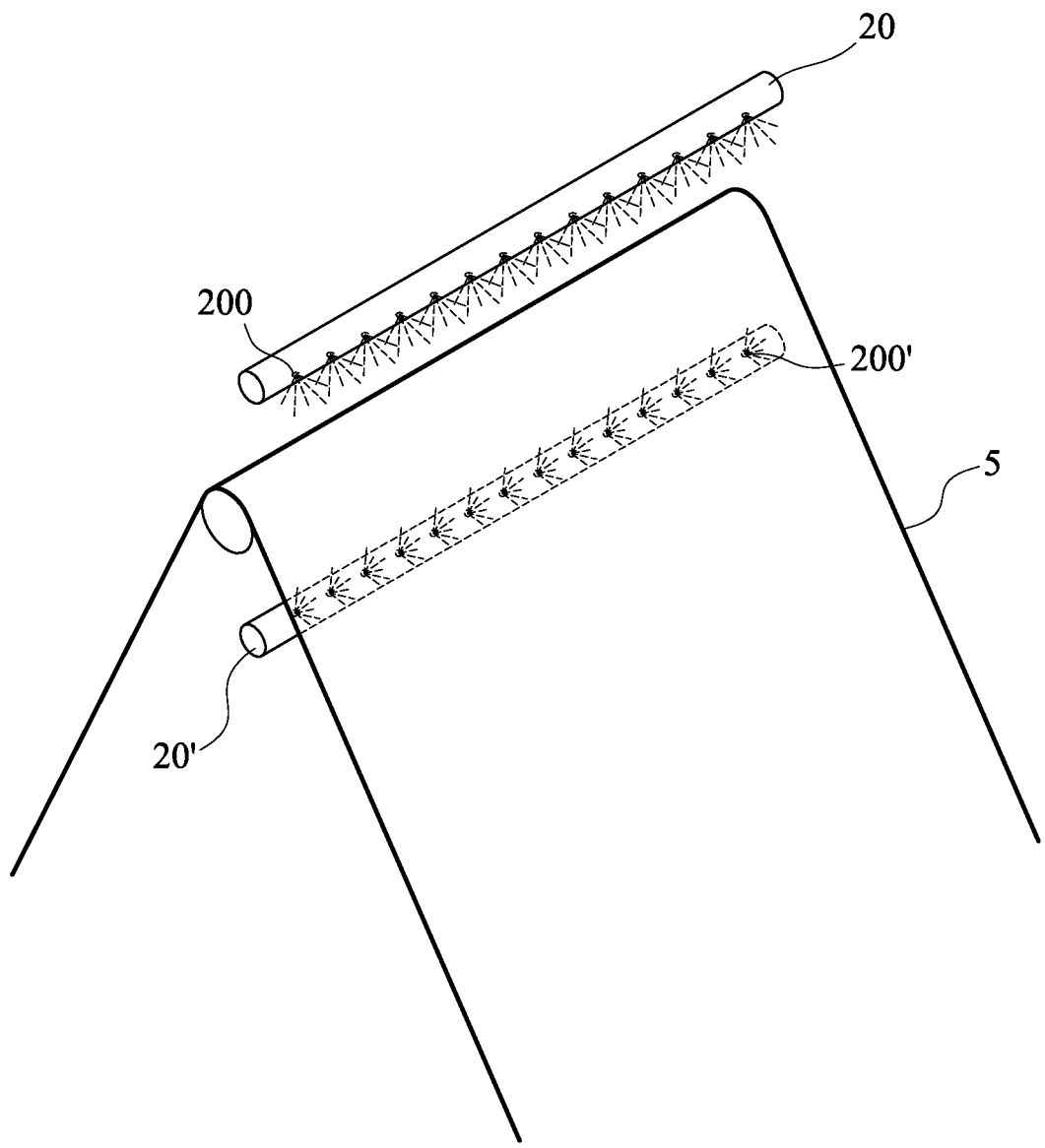
FIG. 2 is a three-dimensional schematic drawing to show the method for cleaning an electrolytic copper foil by using spray-column according to the present invention.

FIG. 2 is a three-dimensional schematic drawing to show the method for cleaning the electrolytic copper foil by using spray-column. As shown in FIG. 2, columns 20 and 20' are implemented on the opposite sides of the electrolytic copper foil 4. There are multiple holes (200 and 200') on columns 20 and 20' to produce fan-shaped spray-column.

In another embodiment, the electrolyte composition in electrolytic tank 1 included a copper sulfate electrolyte containing copper sulfate ($CuSO_4 \cdot 5H_2O$) at the concentration of 270 g/L and sulfuric acid ($H_2SO_4$) at the concentration of 100 g/L. This electrolyte was used to prepare an electrolytic copper foil with the thickness of 8 μm at the liquid temperature of 42° C. and the electric current density of 50 A/dm$^2$.

In the aforementioned embodiment, the composition of electroplating solution in chromic acid tank 2 included chromic acid ($H_2CrO_4$) at the concentration of 1 g/L. This electroplating solution was used to coat a layer of chrome on the electrolytic copper foil at the liquid temperature of 35° C. and the electric current density of 3 A/dm$^2$ so as to form an anti-rust layer.

Comparative Example 1

Deionized water was used as cleaning fluid.

Comparative Examples 2-5

Preparation of Cleaning Fluid Compositions Containing Salts of Group IA Metals 3270 mL of deionized water and the ingredients of the compositions listed in table 1 were fed into a 40 L reactor which has a stirrer to obtain the cleaning liquid compositions.

Comparative Examples 6-7

Preparation of Cleaning Fluid Compositions with Inadequate Amount of Salts of Group IIA Metals 3270 mL of deionized water and the ingredients of the compositions listed in Table 1 were fed into a 40 L reactor which has a stirrer to obtain the cleaning liquid compositions.

Embodiments 1-6

Preparation of Cleaning Fluid Compositions Containing Salts of Group-IIA Metals 3270 mL of deionized water and the ingredients of the compositions listed in Table 1 were fed into a 40 L reactor which has a stirrer to obtain the cleaning liquid compositions of the present invention.

TABLE 1

|  | Metal salt | Metal ion content in cleaning fluid composition |
| --- | --- | --- |
| Comparative examples 1 | — | — |
| Comparative example 2 | Sodium chloride | 5.7 (mg/L) |
| Comparative example 3 | Sodium chloride | 38.3 |
| Comparative example 4 | Potassium chloride | 5.6 |
| Comparative example 5 | Potassium chloride | 32.1 |
| Comparative example 6 | Magnesium chloride | 5.3 |
| Comparative example 7 | Calcium chloride | 5.1 |
| Embodiment 1 | Magnesium chloride | 10.2 |
| Embodiment 2 | Magnesium chloride | 32.8 |
| Embodiment 3 | Magnesium chloride | 63.1 |
| Embodiment 4 | Calcium chloride | 10.4 |
| Embodiment 5 | Calcium chloride | 34.3 |
| Embodiment 6 | Calcium chloride | 65.2 |

Test Example

The surface elements on the electrolytic copper foils, which were washed by the cleaning fluid compositions in the aforementioned comparative examples 1-7 and embodiments 1-6, were analyzed. After the contents of copper, sodium, potassium, magnesium and calcium on the surfaces of the electrolytic copper foils were measured, the ratio of each element in group-IA and group-IIA to the copper content was calculated and shown in Table 2.

The electrolytic copper foils, which were washed by the cleaning fluid compositions in aforementioned comparative examples 1-7 and embodiments 1-6, were cut into test samples in A4 size. The weather-resistance tests were performed on the test samples, and the existence of the gloss on the outer appearances was visually observed. The results are shown in Table 3.

The analysis method for test examples is described in details as follows.

Measurement of Surface Composition:

The secondary ion mass spectrometer (SIMS), TOF SIMS IV, produced by Ion Top Company was used for the analysis. The conditions for the analysis included using $Cs^+$ (25 keV) as ion source and using the sputtered area of 100 um×100 um. The receivable secondary ions included copper $(Cu)^{63}$, copper $(Cu)^{65}$, sodium $(Na)^{23}$, potassium $(K)^{39}$, magnesium $(Mg)^{24}$, and calcium $(Ca)^{40}$. The strength of each element was measured and the percentage of the strength of sodium $(Na)^{23}$, potassium $(K)^{39}$, magnesium $(Mg)^{24}$, and calcium $(Ca)^{40}$ based on the strength of (copper $(Cu)^{63}$+ copper $(Cu)^{65}$) was calculated. The results are shown in Table 2.

The Measurement of Anti-Tarnish Test

The test samples were placed at the constant temperature of 70° C. and the constant relative humidity of 80% for 14 hours. The changes of the outer appearances were observed visually and rated as 5-levels. The results are shown in Table 3.

TABLE 2

| | Percentage of the signal strength of each element analyzed by SIMS (based on the signal strength of copper element as 100%) | | | |
| --- | --- | --- | --- | --- |
| | Sodium | Potassium | Magnesium | Calcium |
| Comparative example 1 | — | — | — | — |
| Comparative example 2 | 0.73 | — | — | — |
| Comparative example 3 | 5.13 | — | — | — |
| Comparative example 4 | — | 0.72 | — | — |
| Comparative example 5 | — | 4.75 | — | — |
| Comparative example 6 | — | — | 0.09 | — |
| Comparative example 7 | — | — | — | 0.05 |
| Embodiment 1 | — | — | 0.14 | — |
| Embodiment 2 | — | — | 0.42 | — |
| Embodiment 3 | — | — | 0.8 | — |
| Embodiment 4 | — | — | — | 0.1 |
| Embodiment 5 | — | — | — | 0.34 |
| Embodiment 6 | — | — | — | 0.7 |

TABLE 3

| | Level of anti-tarnish |
| --- | --- |
| Comparative example 1 | 1 |
| Comparative example 2 | 1 |
| Comparative example 3 | 2 |
| Comparative example 4 | 1 |
| Comparative example 5 | 3 |
| Comparative example 6 | 2 |
| Comparative example 7 | 2 |
| Embodiment 1 | 4 |
| Embodiment 2 | 4 |
| Embodiment 3 | 4 |
| Embodiment 4 | 5 |
| Embodiment 5 | 5 |
| Embodiment 6 | 5 |

The levels of anti-tarnish were defined as follows.
1. Under the visual observation, 100% of the surfaces of the test samples were oxidized and discolored, or the discolored area was less than 100% but changed to green or black, based on the total surface areas of the test samples.
2. Under the visual observation, 75% of the surfaces of the test samples were oxidized and discolored, based on the total surface areas of the test samples.
3. Under the visual observation, 50% of the surfaces of the test samples were oxidized and discolored, based on the total surface areas of the test samples.
4. Under the visual observation, 25% of the surfaces of the test samples were oxidized and discolored, based on the total surface areas of the test samples.
5. Under the visual observation, none of the surfaces of the test samples was oxidized and discolored.

Referring to Table 3, the anti-tarnish property of the electrolytic copper foils washed by the cleaning fluid compositions in embodiments 1-6 is much better than those washed by the cleaning fluid compositions in comparative examples 1-7. In comparing to comparative examples 2-5 with the addition of the salts of group-IA metals, the washed electrolytic copper foils in embodiments 1-6 have better anti-tarnish property. In addition, in comparing to comparative examples 6-7, the washed electrolytic copper foils in embodiments 1-6 have better anti-tarnish property. Based on the results, when the amounts of the salts of group-IIA metals are inadequate, it is difficult to achieve the effects of the cleaning fluid composition of the present invention.

Based on the aforementioned embodiments, in comparison with prior technologies, the cleaning fluid composition of the present invention is more effective in removing acid groups (such as sulfate group, phosphate group, or acetate group). Therefore, the cleaning fluid composition of the present invention is more suitable for cleaning electrolytic copper foils.

The above embodiments are only used to illustrate the principle of the present invention and the effect thereof, and should not be construed as to limit the present invention. The above embodiments can be modified and altered by those skilled in the art, without departing from the spirit and scope of the present invention. Therefore, the protection scope of the present invention is defined in the following appended claims.

What is claimed is:
1. An electrolytic copper foil, comprising: an electrolytically deposited copper foil deposited from an electrolyte bath, said electrolytically deposited copper foil having only acidic sites thereon created during formation of the copper foil during electrodeposition of copper from the electrolyte bath and no other acidic sites being present;
a group-IIA metal selected from the group consisting of magnesium and calcium adhered to the acidic sites of the electrolytically deposited copper foil;
wherein the group-IIA metal adheres to the acidic sites in such a quantity such that a signal strength of the group-11A metal is at least 0.1% based on a signal strength of copper element taken as 100% as analyzed by a secondary ion mass spectrometer.

2. The electrolytic copper foil of claim 1, wherein the signal strength of the group-IIA metal is in a range from 0.1% to 0.8%.

3. The electrolytic copper foil of claim 1, wherein the group-IIA metal is magnesium.

4. The electrolytic copper foil of claim 1, wherein the group-IIA metal is calcium.

5. The electrolytic copper foil of claim 2, wherein the group-IIA metal is magnesium.

6. The electrolytic copper foil of claim 2, wherein the group-IIA metal is calcium.

7. The electrolytic copper foil of claim 1, wherein the acid sites are one selected from the group consisting of a sulfate group, a phosphate group and an acetate group.

8. The electrolytic copper foil of claim 1, wherein the group-IIA metal is present in sufficient quantity to provide protection to the copper foil from oxidation and rust corrosion.

9. An anti-tarnish treated electrolytic copper foil, comprising:
   an electrolytic copper foil body having at least a copper foil surface on the body, said copper foil surface comprising first acidic sites created during electrodeposition of the copper foil body from an electrolyte bath; and
   an anti-tarnish treated surface on the copper foil body, the anti-tarnish treated surface comprising second acidic sites, the second acidic sites being different than said first acidic sites, the anti-tarnish treated surface comprising a group-IIA metal selected from the group consisting of magnesium and calcium, reacted with at least some of the second acidic sites to form an adhered group-IIA metal surface onto the second acidic sites,
   wherein a signal strength of the group-IIA metal in the anti-tarnish treated surface is in the range of 0.1% to 0.8% based on a signal strength of copper element taken as 100% as analyzed by a secondary ion mass spectrometer sufficient to impart anti-tarnish properties to the copper foil.

10. The anti-tarnish surface treated electrolytic copper foil of claim 9, wherein the group-IIA metal is magnesium.

11. The anti-tarnish surface treated electrolytic copper foil of claim 9, wherein the group-IIA metal is calcium.

12. The anti-tarnish surface treated electrolytic copper foil of claim 9, wherein at least some of the first acidic sites have adhered thereto a group-IIA metal selected from the group consisting of magnesium and calcium.

* * * * *